(No Model.) 2 Sheets—Sheet 2.
J. PIPES.
COMBINED PLANTER AND FERTILIZER DISTRIBUTER.
No. 506,251. Patented Oct. 10, 1893.
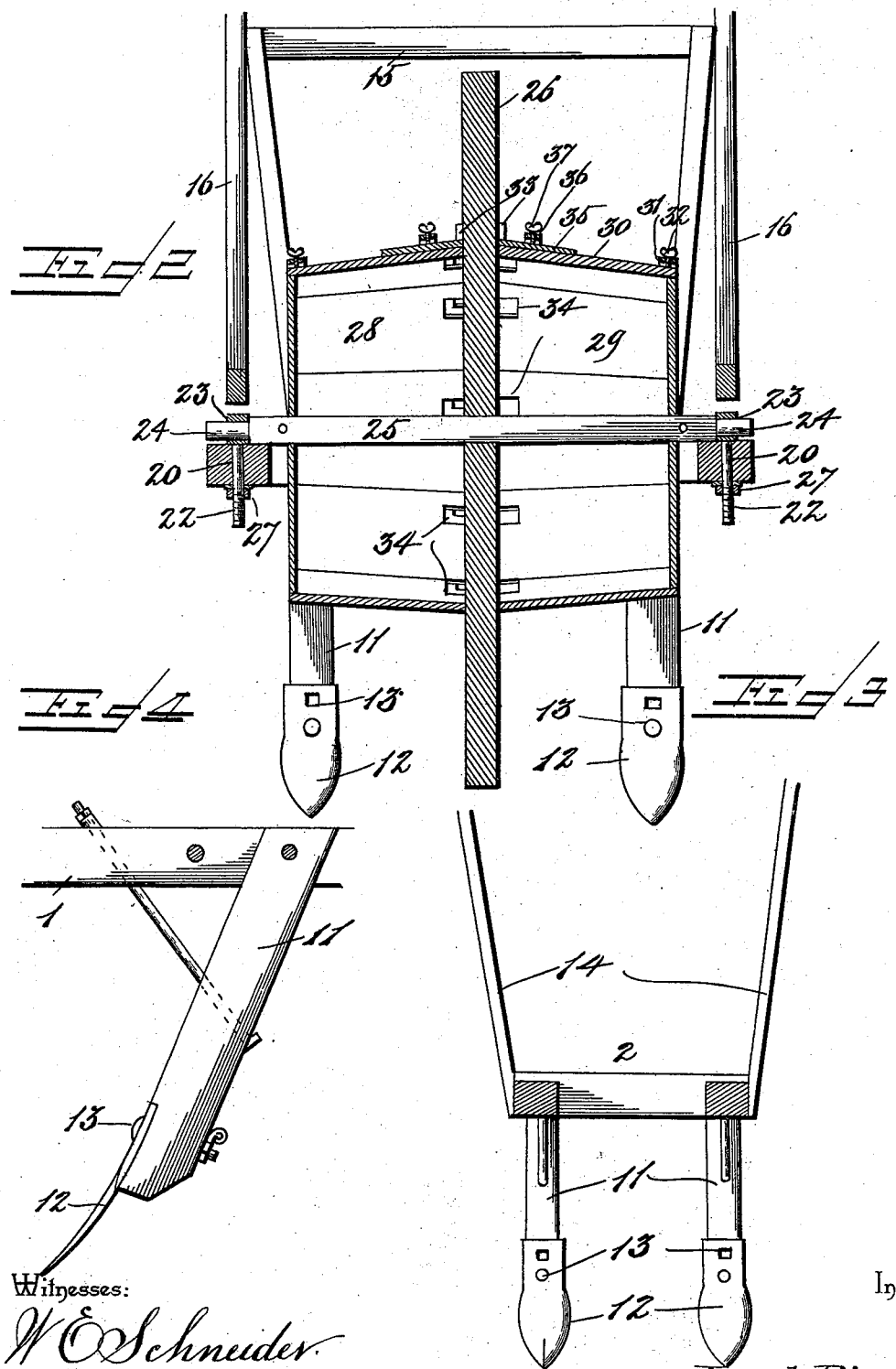
Witnesses:
W. E. Schneider
N. F. Duvall
Inventor:
Joseph Pipes.
By his Attorneys,
C. A. Snow & Co.

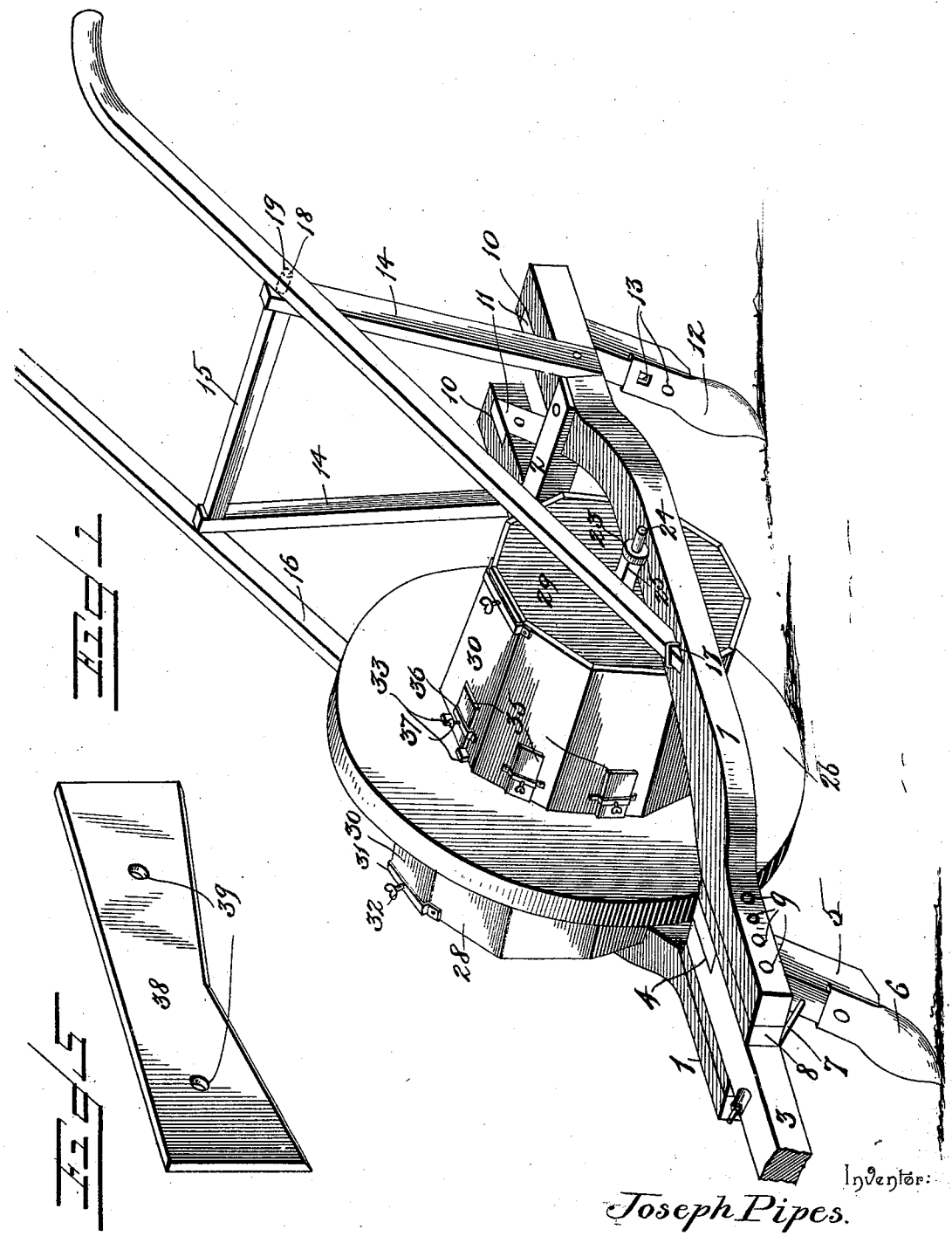

UNITED STATES PATENT OFFICE.

JOSEPH PIPES, OF ARCADIA, LOUISIANA.

COMBINED PLANTER AND FERTILIZER-DISTRIBUTER.

SPECIFICATION forming part of Letters Patent No. 506,251, dated October 10, 1893.

Application filed May 24, 1893. Serial No. 475,334. (No model.)

*To all whom it may concern:*

Be it known that I, JOSEPH PIPES, a citizen of the United States, residing at Arcadia, in the parish of Bienville and State of Louisiana, have invented a new and useful Combined Planter and Fertilizer-Distributer, of which the following is a specification.

My invention relates to improvements in combined planters and fertilizer distributers; the objects in view being to produce a cheap and simple construction of machine from which fertilizer and corn, cotton, or other seed may be simultaneously dropped at predetermined intervals into a furrow formed by the said machine and subsequently covered.

With these and other objects in view the invention consists in certain features of construction hereinafter specified and particularly pointed out in the claims.

Referring to the drawings:—Figure 1 is a perspective view of a combined planter and fertilizer distributer embodying my invention. Fig. 2 is a transverse vertical sectional view of the same. Fig. 3 is a transverse vertical sectional view taken in rear of the seed and fertilizer hoppers. Fig. 4 is a side elevation of a portion of one of the beams and its rear standard. Fig. 5 is a detail of the transverse blade or bar that may be employed in lieu of the covering shovels when desired.

Like numerals of reference indicate like parts in all the figures of the drawings.

In constructing my combined planter and fertilizer distributer I employ a pair of opposite side beams 1, which side beams are bulged or spread at their centers or between their ends for the purpose of accommodating the ground-wheel hereinafter described. Immediately in rear of their diverged or spread portions the beams are connected by a transverse bar 2 which rigidly secures them in relative position. The front ends of the beams 1 do not meet but extend parallel with each other a short distance, and have interposed between the same the draft tongue 3. The rear end of the draft tongue is provided at one side with an inclined recess 4, and in the same is seated the upper end of the inclined standard 5, which at its lower end is provided with a furrow-forming or opening shovel 6, the said standard being braced by means of an inclined brace 7 that passes therethrough and through the tongue 3. Between the face of the tongue 3 and the standard 5, which is in the same plane, there is located a clamping block 8, and through the clamping-block, standard, and tongue and also the front ends of the beams 1 there pass bolts 9, whereby these parts are firmly bound together.

The rear ends of the beams 1, like their front ends, extend parallel to each other a short distance in rear of the cross-bar 2, and have their inner faces provided with inclined recesses 10 in which are seated the upper ends of inclined standards 11, the same carrying furrow-closing or covering shovel 12, the same being secured in position through the medium of heel-bolts 13 passed through the shovels and through the standards.

Vertical standards 14 rise from the beams 1 in rear of the cross-bar 2, and have their upper ends connected by a cross piece 15, these parts constituting a supporting frame for a pair of handles 16, the same being inclined and having their lower ends connected to the beams 1 by clips 17 into which said lower ends are passed. The cross piece 15 has its ends reduced to form tenons 18, and the same pass through perforations 19 formed in said handles, whereby said handles are secured in their inclined positions and thoroughly braced.

In perforations 20 formed in the beams 1 eye-bolts 22 are located, the eyes 23 of the bolts forming bearings for the reduced journals 24 formed upon the ends of a transverse axle 25, the said axle between these reduced points being rectangular and having secured at its center a ground wheel 26 that rotates therewith. The eye-bolts are provided upon their lower ends with nuts 27, through the medium of which they may be raised and lowered, and consequently the location of the frame with relation to the ground adjusted, thus causing the covering-shovels 12 to run deep or shallow as the case may require.

Applied to the opposite sides of the ground-wheel 26 and mounted upon the axle 25 are the hoppers 28 and 29, one being for the accommodation of seed and the other for fertilizer. The hoppers are contracted toward their outer ends and therefore the tendency of the contents of the hoppers is to flow toward the inner ends thereof, whereby the hoppers may be entirely emptied. The hoppers in section are polygonal, and are therefore composed of a series of walls, one of which designated as 30 is slidably mounted in a transverse keeper 31, and is held in position by means of a set-screw in the keeper. By moving these walls 30 from their positions, it will be seen that access to the interiors of the hoppers may be obtained and the same may be filled with seed and fertilizer. Each of the walls of the hoppers is provided with a seed-opening 34 and cut-offs 35 are arranged thereover and are located under transverse keepers 36, the set screws 37 passing through the keepers and impinging upon the cut-offs and serving to retain them either wholly or partially over the openings 34, whereby said openings may be closed against the discharge of seed or opened to a predetermined distance to regulate the out-put or discharge of seed.

This completes the construction of the planter, and the operation is as follows:—The hoppers having been filled with the seed and fertilizer the machine is drawn along in the same manner as an ordinary planter, the front shovel 6 forming the furrow and the ground-wheel 26 traveling in the furrow thus formed. As the openings 34 are successively brought to their lower positions the seed and fertilizer are simultaneously discharged into the furrow, and immediately thereafter the covering shovels 12 return the soil to the furrow, thus covering the seed effectually.

If desired the shovels 12 may be omitted and a transverse covering board 38, shown in Fig. 5, substituted, the heel-bolts 13 serving to secure the board in position, the said board having holes 39 for the accommodation of said bolts. The bottom edge of the board is concaved so that a smooth ridge is produced.

From the foregoing description in connection with the accompanying drawings it will be seen that I have provided a machine well adapted to effectually and simultaneously drop seed and fertilizer in predetermined quantities and at suitable distances apart, it being understood that the distances apart may be regulated by opening or closing certain of the discharge openings in said hoppers; that the machine is strong and durable, has a large capacity and therefore does not require frequent refilling and may be adjusted to run deep or shallow as found necessary.

I do not limit my invention to the precise details herein shown and described, but hold that I may vary the same to any degree and extent within the skill of persons conversant with this class of machines.

Having described my invention, what I claim is—

1. In a planter, the combination with the opposite curved side beams extended at their front ends parallel to each other, the ground-wheel, the opposite hoppers, and the rear covering shovels, of the tongue interposed between the front extended ends of the beams and recessed at its inner side, the standard carrying a shovel and seated in the recess, and the bolts passed through the beams, standard, and tongue, substantially as specified.

2. In a planter, the combination with the opposite curved side beams extended at their front ends parallel to each other, the ground wheel, the opposite hoppers and the rear covering shovels, of a tongue interposed between the front ends of the beams and having a recess, a shovel-carrying standard arranged in the recess, a brace-rod extending from the standard and through the tongue, the clamping-block interposed between the faces of the tongue and standard and adjacent beam, and bolts passing through the blocks, tongue, beams, and standard, substantially as specified.

3. In a planter, the combination with the opposite side beams having the front and rear shovels, and the opposite eye-bolts provided with nuts whereby they are adjustable in said beams of the transverse axle journaled in the eye-bolts, the ground-wheel, and the opposite hoppers mounted on and carried by said axle, substantially as specified.

4. In a planter, the combination with the opposite side beams having front and rear standards and opposite bearings, of the transverse axle, the ground-wheel mounted thereon, the opposite polygonal flared drums, the periphery of each of which is provided with openings and with removable covers or portions, cut-offs mounted over the openings, and keepers provided with set-screws mounted over the cut-offs and over those portions of the walls that are removable, substantially as specified.

In testimony that I claim the foregoing as my own I have hereto affixed my signature in the presence of two witnesses.

JOSEPH PIPES.

Witnesses:
W. P. ODEN,
D. A. TILLEY.